United States Patent [19]
Larson

[11] Patent Number: 5,757,588
[45] Date of Patent: May 26, 1998

[54] HARD DISK ASSEMBLY HAVING A PIVOT BEARING ASSEMBLY COMPRISING FINGERS BEARING ON A SHAFT

[75] Inventor: Nils E. Larson, San Jose, Calif.

[73] Assignee: Western Digital Corporation, Irvine, Calif.

[21] Appl. No.: 671,855

[22] Filed: Jun. 28, 1996

[51] Int. Cl.⁶ .................................................. G11B 5/55
[52] U.S. Cl. .................................................. 360/106
[58] Field of Search .................................. 360/106, 104, 360/97.02, 99.08; 369/255

[56] References Cited

U.S. PATENT DOCUMENTS

| | | | |
|---|---|---|---|
| 4,979,063 | 12/1990 | Ghose et al. | 360/106 |
| 5,355,268 | 10/1994 | Schulze | 360/106 |
| 5,510,940 | 4/1996 | Tacklind et al. | 360/106 |
| 5,559,652 | 9/1996 | Heath et al. | 360/106 |

*Primary Examiner*—Craig A. Renner
*Attorney, Agent, or Firm*—Leo J. Young; Milad G. Shara; W. Chris Kim

[57] ABSTRACT

A head disk assembly for a hard disk drive employs a rotary actuator apparatus including a pivot shaft that defines an actuator axis of rotation. A pivot bearing assembly including a pivot bushing having a plurality of fingers supports rotation of the actuator about the pivot shaft. Each of a plurality of fingers has a bearing end that is in sliding contact with the pivot shaft. The fingers are formed from a material in a shape that provides the stiffness and low coefficient of friction necessary for the desired pivot bearing performance.

7 Claims, 4 Drawing Sheets

HARD DISK ASSEMBLY HAVING A PIVOT BEARING ASSEMBLY COMPRISING FINGERS BEARING ON A SHAFT

BACKGROUND OF THE INVENTION

1. Field of the Invention

The present invention relates generally to hard disk drives and, more specifically, to a hard disk drive having an integrated pivot bearing bushing and support structure in a rotary actuator assembly.

2. Description of the Related Art

A contemporary mass-produced hard disk drive typically employs a rotary actuator structure in a head disk assembly to position transducer heads relative to recording surfaces of rotating disks. The head disk assembly includes a base, a cover and a seal that cooperate to form a sealed housing. The rotary actuator structure includes a pivot bearing assembly, a head stack assembly, and at least one permanent magnet. The head stack assembly includes a coil portion and the permanent magnet cooperates with the coil portion to form a voice coil motor. The pivot bearing assembly includes a pivot shaft that is affixed to the housing and that defines an axis of rotation for the rotary actuator structure. In addition to the stationary pivot shaft, the pivot bearing assembly typically includes a rotatable sleeve, and two sets of ball bearings mounted between the shaft and the sleeve at axially spaced-apart positions. The head stack assembly typically includes an actuator body portion, the coil portion that forms part of the voice coil motor, and a set of head gimbal assemblies, each carrying a transducer head for reading and writing on a magnetic disk surface. The body portion has a bore so that during assembly of the drive the head stack assembly can be fitted around the sleeve of the pivot bearing assembly and then be affixed to the sleeve.

Typical pivot bearing assemblies include ball bearings to provide a means of reducing friction encountered in rotating the actuator, however the ball bearings themselves are relatively expensive and the assembly of such ball bearing based pivot assemblies involves the purchase, handling and installation of multiple parts in order to complete the assembly. A recent example of the art in this area is given in U.S. Pat. No. 5,510,940 issued to Tacklind et al where the pivot assembly includes at least one half individual parts, including the aforementioned ball bearings, and other parts which must meet machining or spring tolerance standards. There is a constant requirement to reduce the manufacturing costs of disk drives while maintaining or improving performance and capacity specifications. Therefore a need exists for improvements in disk drive pivot bearing assemblies in order to maintain low friction and a provide a reduced cost of manufacture.

SUMMARY OF THE INVENTION

An object of the invention is to provide a pivot bearing assembly for rotary actuator assemblies in a head disk assembly.

Another object of the invention is to provide low frictional torque in the bearing.

Another object of the invention is to provide an integral pivot assembly having a reduced parts count to provide lower procurement and assembly labor cost based in part on a self-aligning and self-constraining snap-together assembly procedure.

The invention provides a head disk assembly for a hard disk drive including a housing, a disk having a plurality of tracks, and a head gimbal assembly including a head. The invention further provides stationary means for defining an axis of rotation having an end fixed to the housing. The invention also provides rotatable means operative to rotate relative to the stationary means in a range sufficient to position the head adjacent any of the tracks. The invention provides novel bearing means including a plurality of fingers, each finger having a bearing end at which sliding contact occurs during rotation of the rotatable means relative a fixed axial surface.

In one aspect of the invention, rotatable means include a body portion having a bore wherein each finger has a supported end integral with the body portion and wherein each finger projects inwardly toward the axis of rotation.

In another aspect of the invention, the body portion is a bearing sleeve having an outer cylindrical surface, and the rotatable means further includes an actuator body portion having a bore secured around the bearing sleeve by friction fit.

In a further aspect of the invention each of a first set of the fingers is oriented such that its bearing end is closer to the the base than its supported end, and a second set of the fingers is oriented such that its bearing end is farther from the base than its supported end and a pivot shaft has an exterior shape to provide a first bearing area in sliding contact with the bearing ends of the first set of fingers and a second bearing area in sliding contact with the second set of fingers.

The first set of fingers are oriented to pass over the base of the second set of fingers during assembly. The bearing areas on the shaft constrain the corresponding fingers both axially and radially, leaving only the single rotational degree of freedom about the shaft axis.

Yet another aspect of the invention provides a head disk assembly comprising a housing including a base, a disk having a plurality of tracks, and a head gimbal assembly including a head. An actuator body member has an arm supporting the head gimbal assembly and the invention includes means for defining an actuator axis of rotation including a pivot shaft having one end fixed to the base. The actuator body is rotatable about the actuator axis of rotation to position the head coincident to any of the tracks. A plurality of fingers is provided, each finger having a bearing end and a supported end, and each finger is oriented such that that its bearing end is closer to the axis of rotation than its supported end. Each of a first set of the fingers is oriented such that its bearing end is closer to the base than its supported end, and each of a second set of the fingers is oriented such that the bearing end is farther from the base than its supported end. The pivot shaft has an exterior shape to provide a first bearing area in sliding contact with the bearing ends of the first set of fingers, and a second bearing area in sliding contact with the second set of fingers.

In a further aspect of the invention, the pivot shaft is mounted parallel to the rotary disk spindle axis, the base, and the fingers are integrated elements of a bearing bushing.

In still another aspect of the invention, the bearing bushing is a unitary plastic part.

The invention thus described will be more fully understood and appreciated through consideration of the following detailed description of a preferred embodiment, presented in conjunction with the accompanying drawings.

The drawings referred to in this description should be understood as not being drawn to scale except if specifically noted.

DETAILED DESCRIPTION

Figure 1:
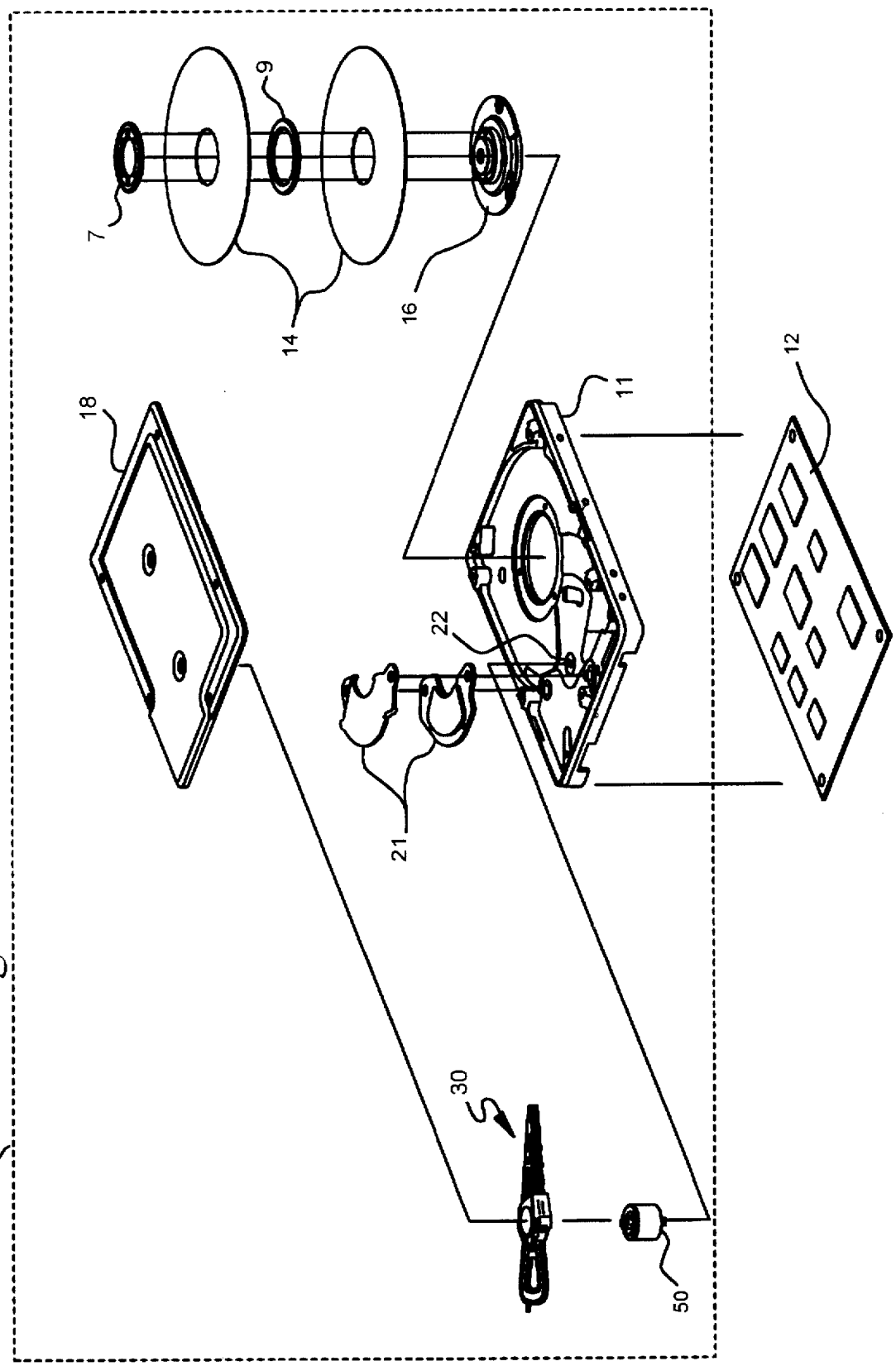
FIG. 1 is an exploded, perspective view of a disk drive with a head disk assembly including an embodiment of this invention.

Referring to FIG. 1, a head disk assembly (HDA) 10 in a hard disk drive includes a housing formed by a base 11, and a cover 18 secured to base 11 by fasteners and a tape seal (not shown.) The HDA further includes a spindle motor 16 rotatably supporting one or more magnetic disks 14 having a plurality of concentric tracks for recording data (not shown), a spacer 9 between disks 14, and a disk clamp 7. Various fasteners (not shown) secure the disks to the spindle motor 16 via the disk clamp 7.

The HDA further includes permanent magnets 21, forming a part of a voice coil motor for positioning data read and write transducers (not shown), a head stack assembly 30 for supporting the read and write transducers, and a base-mounted pivot bearing assembly 50 for rotatably supporting the head stack assembly. Controller assembly 12 provides integrated circuits used to control HDA 10 and to provide data conversion and transfer between HDA 10 and a host computer (not shown).

Figure 2:
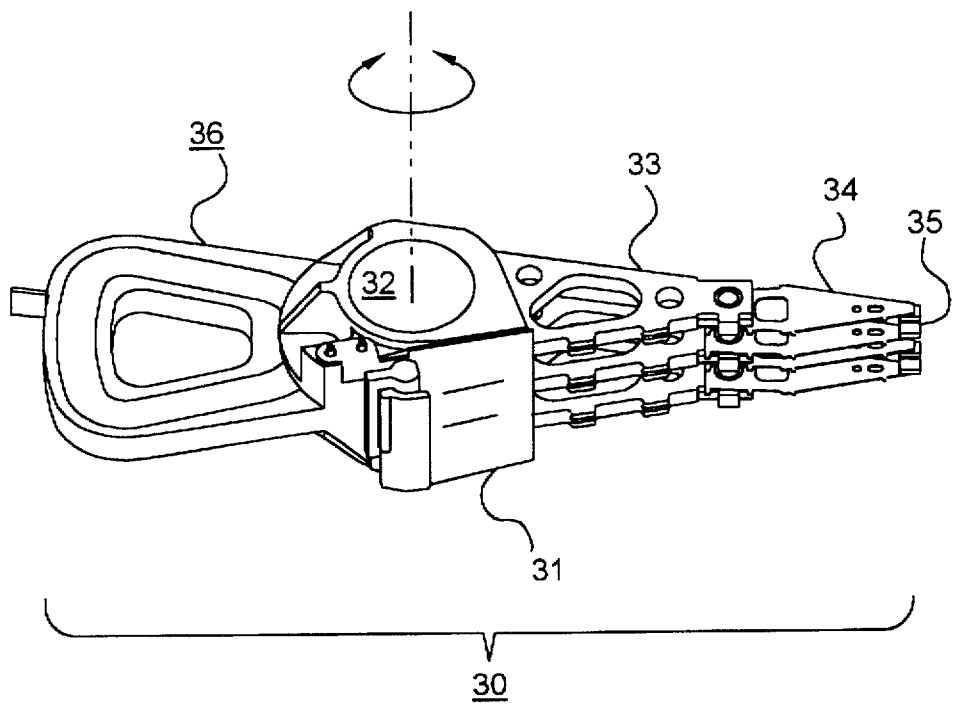
FIG. 2 is an enlarged perspective view of a head stack assembly used in conjunction with the invention.

FIG. 2 provides a more detailed perspective view of head stack assembly 30. Body portion 31 provides support for coil 36 and head suspension support arms 33 and further includes a bore 32 defining an axis of rotation for the head stack assembly. Coil 36 in combination with permanent magnets 21 forms a voice coil motor for rotating the head stack assembly radially across magnetic disks 14 to read and write data on specific areas of the disks. With the inclusion of pivot bearing assembly 50, head stack assembly 30 and permanent magnets 21 forms a mechanism known in the art as a rotary actuator.

Load beams 34 are attached to head suspension support arms 33 at one end and at a distal end magnetic transducers or "heads" 35 for reading and writing data are attached. Magnetic transducer 35 is typically encapsulated in a structure known as a "slider" and is mounted on the load beam in a gimbal arrangement allowing the head to be positioned in an optimal attitude. Load beams 34 are thin, flexible supports which permit magnetic transducers 35 to "fly" on a minute cushion of air above the surface of disks 14. The combination of load beam 34 and magnetic transducer 35 forms a "head gimbal assembly."

Figure 3:
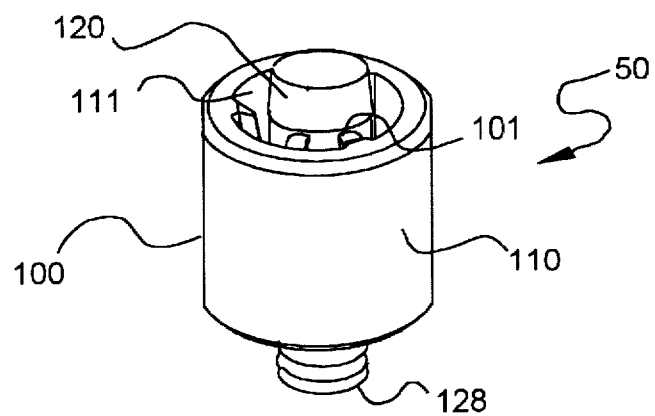
FIG. 3 is a perspective view of the integrated pivot bearing assembly including the pivot bushing and shaft.
Figure 4A:
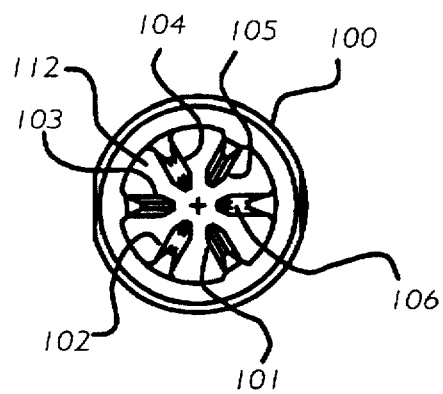
FIG. 4a is a plan view of the pivot bushing with the bearing fingers.
Figure 4B:
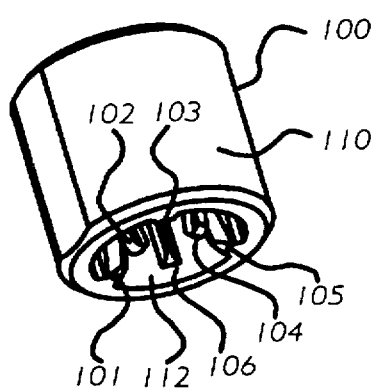
FIG. 4b is a perspective view of the pivot bushing from the lower end.

Pivot bearing assembly 50, shown in perspective view in FIG. 3 comprises pivot bushing 100 and shaft 120. Pivot bushing 100 is preferably a plastic molded part having a sleeve portion 110 with an inner cavity 111 and, in a preferred embodiment, six "fingers" extending from the inner surface of sleeve 110 within inner cavity 111 towards the center of the bushing. A suitable material for pivot bushing 100 is a lubricious stiff plastic which is impregnated with polytetrafluoroethylene or Teflon™. FIG. 4a shows a plan view of pivot bushing 100 with fingers 101, 102, 103, 104,105, and 106. Fingers 101, 103 and 105 project upward from the lower inner surface of sleeve 110, while fingers 102, 104, and 106 project downward from the upper inner surface of sleeve 110. FIG. 4b is a perspective view from the lower end of pivot bushing 100.

Figure 5:
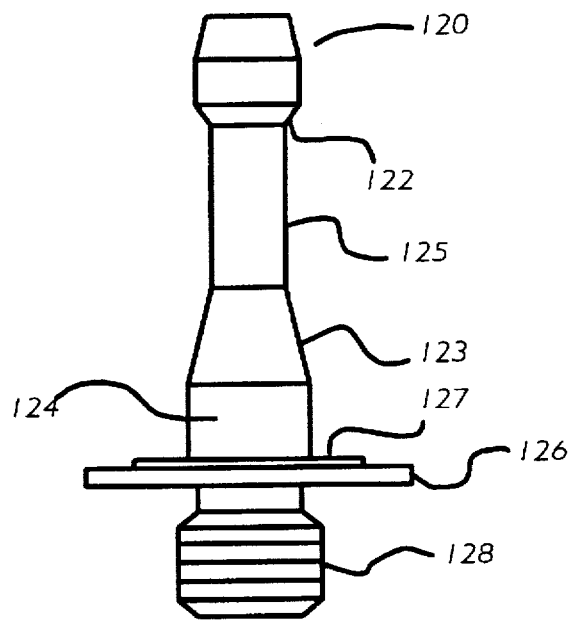
FIG. 5 is a plan view (side) of the stationary shaft portion of the pivot bearing assembly.

FIG. 5 is a side view of shaft 120, preferably made from polished or plated steel, including bevel 122 forming an upper bearing surface. Neck 125 extends through flared area 123 to form lower shaft bearing surface 124. A lower shoulder bearing surface 127 is formed over flange 126 which defines the portion of shaft 120 abutting base 11 when mounted. Insert segment 128 is preferably threaded to provide attachment to base 11 through threaded insert hole 22.

Pivot bushing 100 is slipped over shaft 120 to form pivot bearing assembly 50 using snap features to be discussed below for retention. Pivot bearing assembly 50 is inserted into bore 32 of head stack assembly 30 using any useful bonding means such as adhesive, a press fit or retaining screw for retention. For assembly into HDA 10, an insert portion 128 of shaft 120 is threaded or otherwise bonded to base 11, forming a stationary pivot point for the rotary actuator comprising head stack assembly 30 and pivot bearing assembly 100. During operation of the rotary actuator, pivot bushing 100 rotates around stationary shaft 120 providing a bearing function from the contact of fingers 101-106 with shaft 120.

Figure 6A:
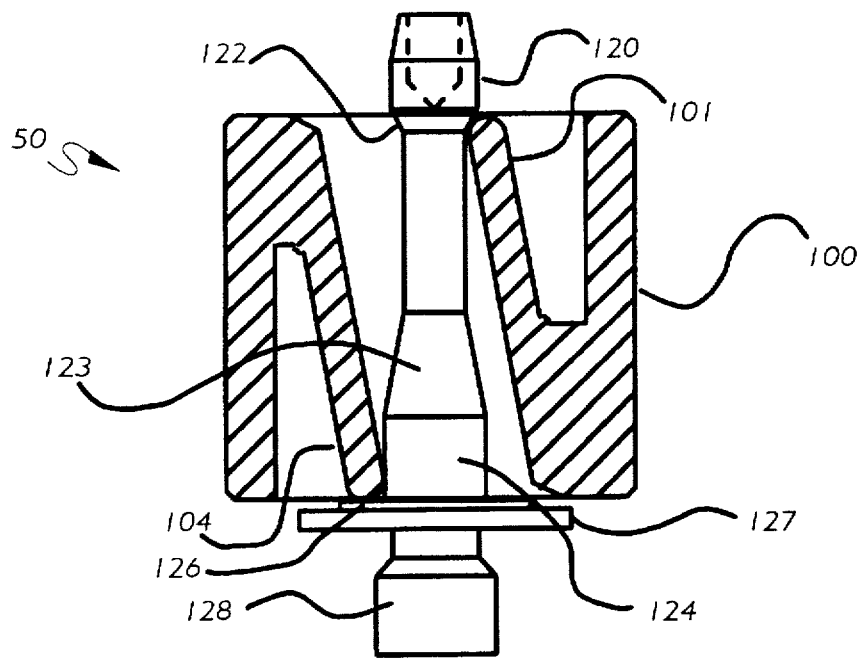
FIG. 6a 6b and 6c are sectional views of the bushing in sliding contact with the pivot shaft.
Figure 6B:
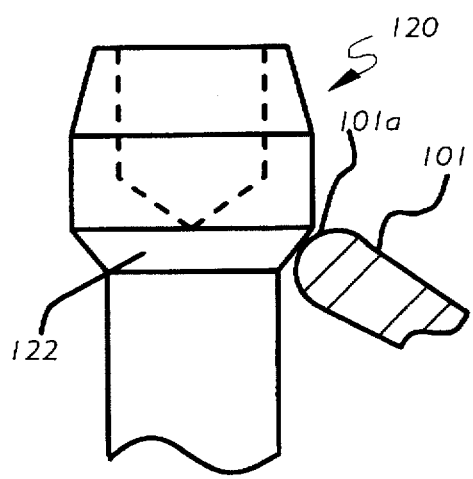
Figure 6C:
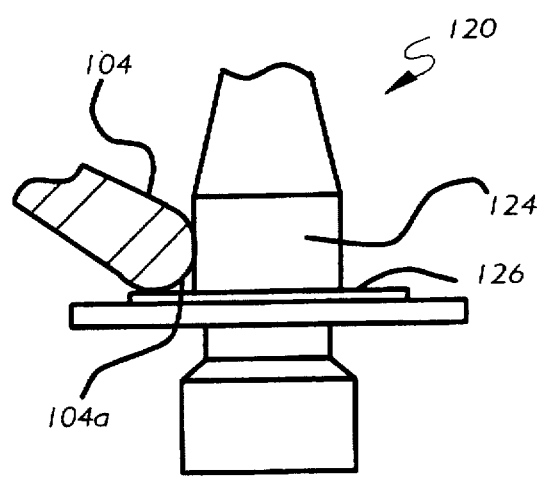

FIGS. 6a, 6b and 6c are cross sectional plan views of pivot bearing assembly 50. Pivot bushing 100 is retained in position over shaft 120 by the combined "snap" action of fingers 101, 103, and 105 sliding over the tapered bevel 122 while fingers 102, 104, and 106 slide over flared area 123 coming to rest at the junction of shoulder 127 and lower bearing surface 124. Fingers 101-106 are formed with a cross sectional area providing sufficient flexibility to slide over the snap areas of shaft 120 while maintaining sufficient stiffness to provide balanced axial and radial retention pressure against tapered upper bearing surface 122 and lower bearing surface 124 and shoulder 127.

The distal end of each finger as exemplified by 101a and 104a is rounded to form a spherical surface which provides the bearing contact between finger and shaft. The spherical surface provides a point contact which minimizes friction by "sliding" around the bearing surface of the shaft during rotation of the actuator.

The pivot bearing assembly thus described provides a means for rotatably supporting a head stack assembly with low torque required for rotation and low bearing friction providing for high actuator performance.

Other embodiments of the pivot bearing assembly may be employed without departing from the spirit of the invention. Such embodiments may include a molded shaft having fingers which bear on a pivot bushing having a steel sleeve or a variation having a different number of fingers.

I claim:

1. A head disk assembly for a disk drive comprising:

a housing including a base;

a disk having a plurality of tracks;

a head gimbal assembly including a head;

an actuator body member having an arm supporting the head gimbal assembly;

means for defining an actuator axis of rotation, which includes a pivot shaft having one end fixed to the base;

the actuator body member being rotatable about the actuator axis of rotation to position the head adjacent any of the tracks;

a plurality of fingers, each finger having a bearing end and a supported end;

each finger being oriented such that its bearing end is closer to the axis of rotation than its supported end;

each of a first set of the fingers being oriented such that its bearing end is closer to the base than its supported end, and each of a second set of the fingers being oriented such that its bearing end is farther from the base than its supported end; and the pivot shaft having an exterior shape to provide a first bearing area in sliding contact with the bearing ends of the first set of fingers and a second bearing area in sliding contact with the second set of fingers.

2. The head disk assembly of claim 1, wherein: the pivot shaft is mounted parallel to an axis of rotation of the disk, and the fingers are integrated elements of a bearing bushing.

3. The head disk assembly of claim 2, wherein:

the bearing bushing is a unitary, plastic part.

4. The head disk assembly of claim 2 further comprising:

the bearing bushing having first and second ends along the actuator axis of rotation, and each of the first set of fingers contacts the pivot shaft proximate the first end of the bearing bushing, and each of the second set of the fingers contacts the pivot shaft proximate the second end of the bearing bushing.

5. The head disk assembly of claim 4, wherein there are at least six fingers, three each proximate each of the first and second ends, respectively.

6. The assembly of claim 5, wherein:

the fingers are adapted to exert a substantially constant load on the pivot shaft and to provide a stable axis of rotation of the bearing bushing about the pivot shaft.

7. A head disk assembly comprising:

a housing including a base;

a disk having a plurality of tracks;

a head gimbal assembly including a head;

stationary means for defining an axis of rotation, the stationary means comprising a pivot shaft having an end fixed to the base;

rotatable means for supporting the head gimbal assembly comprising a body portion having a bore, the rotatable means being operative to rotate relative to the stationary means through a range sufficient to position the head adjacent any of the tracks;

bearing means including a first set of fingers and a second set of fingers, each finger having a supported end integral with the body portion and each finger projecting inwardly toward the axis of rotation;

each finger further having a bearing end at which sliding contact occurs during rotation of the rotatable means;

each of the first set of fingers being oriented such that its bearing end is closer to the base than its supported end and each of the second set of fingers is oriented such that its bearing end is farther from the base than its supported end; and the pivot shaft having an exterior shape to provide a first bearing area in sliding contact with the bearing ends of the first set of fingers and a second bearing area in sliding contact with the bearing ends of the second set of fingers.

* * * * *